United States Patent Office 3,086,056
Patented Apr. 16, 1963

3,086,056
PHOSPHINES
Ross I. Wagner, Montebello, Calif., assignor to American Potash & Chemical Corporation, a corporation of Delaware
No Drawing. Original application Nov. 8, 1957, Ser. No. 695,241. Divided and this application July 8, 1960, Ser. No. 44,491
13 Claims. (Cl. 260—606.5)

This invention relates in general to the preparation of phosphines which contain more than a single phosphorus atom, and phosphines which have a heterocyclic ring which includes the phosphorus atom itself. This application is a division of applicant's co-pending U.S. patent application, Serial No. 695,241, filed November 8, 1957.

An object of this invention is to provide a method for the preparation of primary and secondary difunctional phosphines, phosphines which contain more than a single phosphorus atom, and secondary heterocyclic phosphines which are phosphines having a heterocyclic ring including the phosphorus atom itself, the process being suitable for producing these two novel types of chemical compounds substantially individually or in admixture.

A further object of this invention is to provide new chemical compounds, difunctional phosphines which contain more than a single phosphorus atom and phosphines which contain a heterocyclic ring having a phosphorus atom incorporated therein, these new chemical compounds being useful, as set forth in our copending applications, Serial No. 666,213, filed June 17, 1957, now Patent No. 2,925,440 for Phosphinoborine Compounds and Their Preparation and Serial No. 666,208, filed June 17, 1957, now Patent No. 2,926,194 for Phosphine Borine Compounds and Their Preparation.

Other objects and advantages of this invention, if not specifically set forth, will become apparent during the course of the discussion which follows.

Generally, it has been found that phosphines containing the phosphorus in a heterocyclic ring and difunctional phosphines, may be obtained where phosphine or a primary organo-phosphine and an alkali metal are reacted under certain conditions and the reaction product so prepared is thereafter treated with an alkyl dihalide. Individual products are readily isolated wherever the heterocyclic and difunctional material are secured in admixture.

More particularly, the preparation of certain phosphines containing the phosphorus in a heterocyclic ring and/or phosphines which are difunctional, i.e., having more than a single phosphorus atom within a molecule, may be accomplished as follows:

Equal molar quantities of phosphine ($PH_3$) or a primary organo-phosphine ($RPH_2$), and an alkali metal are reacted, the phosphine material being passed into a stirred solution of the alkali metal dissolved in refluxing ammonia until the blue color is replaced by the yellow color of $MPH_2$ or $MPHR$, where M is an alkali metal. In the preferred embodiment of this invention, R represents phenyl, lower alkyl-substituted phenyl and halo-substituted phenyl. Lithium, potassium and sodium are the preferred alkali metals for use in the process because of their availability—but the other alkali metals will serve satisfactorily also. Preferably, the by-product $H_2$ is vented through a mercury bubbler to prevent access of air to the interior of the apparatus. Other suitable means for removing the hydrogen from the reaction vessel and preventing access of air are known to the art and may be employed. An alkyl dihalide having the general formula $(CH_2)_nX_2$, where $n$ is one to seven and wherein X represents a halogen, is then added to the contents of the reaction vessel until the yellow color is discharged. The alkyl dihalide may be added as rapidly as permitted by the apparatus used—limited only by the capacity of the reflux condenser to return volatilized solvent to the reaction vessel. The product, if sufficiently volatile at $-33°$ C., is azeotropically distilled from the reaction mixture with the solvent and then freed of residual ammonia by passing the immiscible product layer through a suitable material for adsorption of the ammonia. Suitable materials are water or anhydrous zinc sulfate at 0° C. The product is then purified by distillation. This procedure for separating the solvent and the product is suitable if the desired product is sufficiently volatile at the boiling point of ammonia, $-33°$ C. However, where the product is high boiling, it is distilled from the reaction vessel after evaporation of the solvent and thereafter purified by fractional distillation.

A mixture of products is secured by the reaction, one of which is a difunctional phosphine having the formula $(CH_2)_n(PH_2)_2$, wherein $n$ is an integer varying from 3 through 7, and the other is the secondary heterocyclic phosphine, the ring including the phosphorus atom, having the formula

when the phosphorus containing reagent is phosphine.

When a primary organo-phosphine is used as the phosphorus-containing reagent, the two products are a difunctional secondary phosphine having the formula $(CH_2)_n(PHR)_2$, and the heterocyclic tertiary phosphine having the formula

Here, the symbol R may represent an aliphatic or aromatic radical. The cyclic and difunctional materials may then be separated by fractional distillation, the cyclic phosphine being volatilized first.

The preparative reactions are represented by the following general equations,

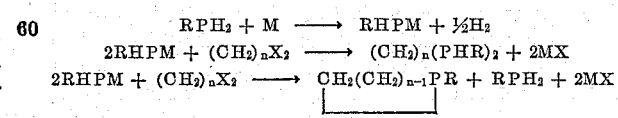

where R is either hydrogen or an organic radical, M is an alkali metal, X is a halogen, and $n$ is an integer indicative of the number of methylene groups in the alkyl dihalide.

The preparation of the unsymmetrically substituted difunctional phosphines is accomplished by first preparing the compound $R(PH_2)_2$ as set forth in the examples which follow and thereafter forming a metal salt on one P. Thereafter the compound is alkylated with R'X to make $H_2PRPHR'$. The procedure is repeated on the other phosphorus atom and it is alkylated with R"X to yield R"HPRPHR' wherein R' and R" are aliphatic radicals.

Examples of the preparation of cyclic phosphines and difunctional phosphines are set out below.

*Example 1.*—Phosphine in the amount of 0.717 g. (0.0211 mole) was condensed into a tube containing 0.4847 g. (0.02108 mole) Na dissolved in a 15 ml. quantity of ammonia. After the blue color of the solution was replaced by the yellow color of sodium phosphinide, a quantity of 1.3152 g. (0.01035 mole) of $(CH_2)_4Cl_2$ was then added causing the yellow color to disappear from the reaction mixture. External cooling was used to maintain the reaction temperature in the range $-78°$ C. to $-33°$ C. The product was relatively non-volatile at the boiling point of ammonia, $-33°$ C. The products were freed of ammonia by fractional distillation. A mixture of products was secured, 0.5754 g., or a yield of 45.5 percent of $(CH_2)_4(PH_2)_2$ ($B_{2.2}$ 25° C.) and 0.4129 g., or a yield of 45.3 percent of

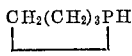

($B_9$ 0° C.). The heterocyclic ring phosphine material was separated from the difunctional phosphine by distillation under vacuum with a fractional distillation column having a vapor take-off head.

*Example 2.*—Phosphine was passed into a stirred solution of 1.0 mole Na dissolved in 1 liter of refluxing ammonia until the blue color was replaced by the yellow color of $NaPH_2$. The by-product $H_2$ was vented through a series of cold traps to catch unreacted and by-product phosphine and a mercury bubbler was used to prevent access of air into the apparatus. Thereafter, liquid $(CH_2)_7Br_2$ in a molar ratio of one mole to each two moles phosphine employed was added to the refluxing mixture until the yellow color formed by the interaction of the phosphine and sodium disappeared. The product had a boiling point somewhat higher than that of the ammonia and therefore it was necessary to evaporate the solvent first. The product was finally purified by fractional distillation. The product was a mixture of $(CH_2)_7(PH_2)_2$ and

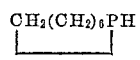

These two compounds were separated by fractional distillation.

*Example 3.*—A solution was prepared of 4.11 moles Na in 1.5 liters of refluxing ammonia ($-33°$ C.) and thereafter 4.21 moles phosphine, $PH_3$, was added. The sodium was used in a weight of 95.4 g. and 143 g. of the phosphine were needed. In accordance with the method set forth in Example 2 above, the by-product $H_2$ was passed through a series of traps and the unreacted $PH_3$ removed. A total of 263 g. or 2.07 moles of $(CH_2)_4Cl_2$ was added at the rate dictated by the capacity of the reflux condenser. The yellow color of the mixture disappeared toward the end of the addition. The products were separated from solvent and from each other by fractional distillation. Quantities of 39.9 g. of $$(CH_2)_4(PH_2)_2$$

or 15.8 percent, and 119.5 g.

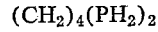

or 65.7 percent were obtained.

*Example 4.*—Sodium phosphinide was prepared by the direct exothermic reaction of 0.6032 g. (0.0262 mole) sodium with 0.891 g. (0.0262 mole) phosphine in 8 ml. liquid ammonia at $-78°$ C. in a 1 inch diameter heavy wall Pyrex bomb tube of 85 ml. volume. A 1.3047 g. (0.0132 mole) sample of ethylene dichloride was added to the tube at $-196°$ C. and the mixture in the sealed tube was warmed to room temperature for 20 minutes. The bomb tube was then opened and the volatile products were distilled into a 15 ml. centrifuge cone. The immiscible lower layer of product was mechanically separated from the solvent ammonia and purified by fractional condensation. Physical properties of the product were determined as follows: Molecular weight, 60.0; M.P., $-121.4°$ to $-120.9°$ C.; vapor pressure equation, $\log_{10} P_{mm} = 7.753 - 1509/T$. A non-volatile viscous liquid formed on standing at ambient temperatures.

The cycloethylenephosphine formed according to the following equation:

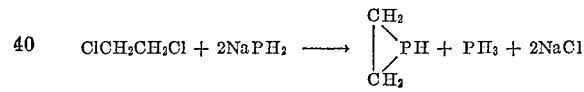

*Example 5.*—A solution was prepared of 27.1 g. sodium (1.18 moles) in 1 liter of refluxing ammonia and thereafter 47 g. of phosphine (1.38 moles) was added. The by-product $H_2$ was passed through a series of traps and the unreacted $PH_3$ removed. A total of 69.2 g. (0.612 mole) of $(CH_2)_3Cl_2$ was added at a rate dictated by the capacity of the reflux condenser. The yellow color of the mixture disappeared toward the end of the addition and the product was isolated after distilling the solvent from the reaction mixture. The product was freed of residual ammonia by passing it through anhydrous zinc sulfate at 0° C. and was then purified by distillation. Fractional distillation was used to separate the products of the reaction, and the yield of $(CH_2)_3(PH_2)_2$ was determined to be 14.3 g. or 23.0 percent.

*Example 6.*—Substantially in the manner set forth in Example 5 above, 26.5 g. (1.15 moles) sodium were reacted with 41 g. (1.20 moles) phosphine and thereafter this product treated with 115.7 g. (0.573 mole) of $(CH_3)_3Br_2$. 34.7 g. $(CH_2)_3(PH_2)_2$, a 56 percent yield, was obtained.

*Example 7.*—In the fashion set forth above, 31.8 g. (1.38 moles) sodium were reacted with a 47.7 g. phosphine (1.40 moles) phosphine in refluxing ammonia and thereafter this product treated with 213.9 g. (0.69 mole) of $(CH_2)_4I_2$. The products, $(CH_2)_4(PH_2)_2$ and

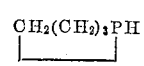

were isolated in accordance with the methods set forth above.

The stoichiometry for further typical runs is set forth below:

Table I

| Ex. | Reagents | | | | | | | | | Products | |
|---|---|---|---|---|---|---|---|---|---|---|---|
| | Alkali metal | | R | RPH₂ | | (CH₂)ₙX₂ | | (CH₂)ₙX₂ | | (CH₂)ₙ(PHR)₂ | CH₂(CH₂)ₙ₋₁PR |
| | M | Weight, g. | Moles | | Weight, g. | Moles | | Weight, g. | Moles | | |
| 10 | Na | 0.4205 | 0.01829 | C₂H₅ | 1.135 | 0.01829 | (CH₂)₄Cl₂ | 1.16 | 0.00916 | (CH₂)₄(PHC₂H₅)₂ | CH₂(CH₂)₃PC₂H₅ |
| 11 | Na | 2.38 | 0.103 | i-C₃H₇ | 8.0 | 0.105 | (CH₂)₄Br₂ | 10.58 | 0.049 | (CH₂)₄(PH-i-C₃H₇)₂ | CH₂(CH₂)₃P-i-C₃H₇ |
| 12 | Na | 0.3797 | 0.01650 | n-C₅H₁₁ | 1.714 | 0.01648 | (CH₂)₅Cl₂ | 1.156 | 0.00820 | (CH₂)₅(PH-n-C₅H₁₁)₂ | CH₂(CH₂)₄P-n-C₅H₁₁ |
| 13 | Na | 0.3396 | 0.01477 | i-C₄H₉ | 1.320 | 0.01464 | (CH₂)₅Cl₂ | 1.037 | 0.00735 | (CH₂)₅(PH-i-C₄H₉)₂ | CH₂(CH₂)₄P-i-C₄H₉ |
| 14 | Na | 0.3038 | 0.01320 | n-C₈H₁₇ | 1.939 | 0.01326 | (CH₂)₄Cl₂ | 0.845 | 0.00665 | (CH₂)₄(PH-n-C₈H₁₇)₂ | CH₂(CH₂)₃P-n-C₈H₁₇ |
| 15 | Na | 23.0 | 1.00 | CH₃ | 48 | 1.00 | (CH₂)₃Br₂ | 102.0 | 0.505 | (CH₂)₃(PHCH₃)₂ | |
| 16 | Na | 0.6496 | 0.02824 | CH₃ | 1.835 | 0.02821 | (CH₂)₂Cl₂ | 1.3911 | 0.01405 | | CH₂CH₂PCH₃ |
| 17 | Na | 23.0 | 1.00 | CH₃ | 49 | 1.02 | (CH₂)₄Cl₂ | 66.0 | 0.52 | (CH₂)₄(PHCH₃)₂ | CH₂(CH₂)₃PCH₃ |
| 18 | K | 2.627 | 0.0672 | p-C₂H₅C₆H₄ | 9.228 | 0.0668 | (CH₂)₅Cl₂ | 4.683 | 0.0332 | (CH₂)₅[PH(p-C₂H₅C₆H₄)]₂ | CH₂(CH₂)₄P(p-C₂H₅C₆H₄) |
| 19 | Li | 0.3255 | 0.0469 | C₆H₅ | 5.212 | 0.0473 | (CH₂)₇Cl₂ | 3.991 | 0.0236 | (CH₂)₇(PHC₆H₅)₂ | CH₂(CH₂)₆PC₆H₅ |
| 20 | Na | 0.7175 | 0.0312 | C₆H₅CH₂ | 3.926 | 0.0316 | (CH₂)₆Cl₂ | 2.388 | 0.0154 | (CH₂)₆[PH(CH₂C₆H₅)]₂ | CH₂(CH₂)₅PCH₂C₆H₅ |
| 21 | K | 0.6294 | 0.0161 | p-ClC₆H₄ | 2.284 | 0.0158 | (CH₂)₄Cl₂ | 0.9780 | 0.00769 | (CH₂)₄[PH(p-ClC₆H₄)]₂ | CH₂(CH₂)₃P(p-ClC₆H₄) |
| 22 | Na | 0.2778 | 0.01208 | C₆H₅ | 1.3268 | 0.01205 | (CH₂)₃I₂ | 1.776 | 0.00600 | (CH₂)₃(PHC₆H₅)₂ | |
| 23 | Na | 0.7975 | 0.03468 | p-CH₃C₆H₄ | 4.310 | 0.03472 | (CH₂)₄Cl₂ | 2.2025 | 0.01734 | (CH₂)₄[PH(p-CH₃C₆H₄)]₂ | CH₂(CH₂)₃P(p-CH₃C₆H₄) |
| 24 | Na | 2.534 | 0.1102 | 2,4,6-(CH₃)₃C₆H₂ | 16.832 | 0.1106 | (CH₂)₄Cl₂ | 6.999 | 0.0551 | (CH₂)₄{PH[(CH₃)₃C₆H₂]}₂ | CH₂(CH₂)₃P[(CH₃)₃C₆H₂] |
| 25 | Na | 0.8854 | 0.0385 | p-BrC₆H₄ | 7.204 | 0.0381 | (CH₂)₅Br₂ | 4.354 | 0.0189 | (CH₂)₅[PH(p-BrC₆H₄)]₂ | CH₂(CH₂)₄P(p-BrC₆H₄) |

*Example 8.*—2.384 g. (49.64 mmoles) CH₃PH₂ was added to a 50 ml. reaction flask cooled to −78° C. containing 35 ml. liquid ammonia and sodium amide, prepared from 1.1415 g. (49.64 mmoles) sodium. To the resulting solution of sodium methylphosphinide, CH₃PHNa, was added 4.320 g. (50.85 mmoles) CH₂Cl₂. After 30 minutes reaction time at −78° C., the solvent and volatile products were distilled from the by-product sodium chloride and separated by fractional distillation. Bis-(methylphosphino)methane, (CH₃HP)₂CH₂, was isolated by removal through a vapor take-off distilling head at −20° to −15° C. under high vacuum. The product, which was unstable at ambient temperatures, melted over the range −20° to −13° C. and had a molecular weight 102.2 (calc. 108.07).

*Example 9.*—A solution was prepared of 1.37 moles (31.8 g.) Na in 0.5 liter refluxing ammonia (−33° C.) and 1.47 moles (47.7 g.) phosphine added. As described in Example 2 above, the by-product H₂ was passed through a series of traps and the unreacted PH₃ removed. A quantity of 97.3 g or 0.69 moles of (CH₂)₅Cl₂ was added at a rate appropriate for the size reflux condenser selected. The yellow color of the mixture disappeared toward the end of the addition. The products were separated from the solvent and from each other by fractional distillation. Good yields of (CH₂)₅(PH₂)₂ and

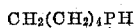
CH₂(CH₂)₄PH were secured.

The preparation of primary-secondary difunctional phosphines and unsymmetrically substituted secondary difunctional phosphines from compounds of the type R(PH₂), disclosed above, is outlined by the following equations where M is an alkali metal, X is a halogen and R′ and R″ represent different alkyl radicals and R represents a polymethylene radical.

H₂PRPHR′

$$R(PH_2)_2 + M \rightarrow H_2PRPHM + \tfrac{1}{2}H_2$$
$$H_2PRPHM + R'X \rightarrow H_2PRPHR' + MX$$

R″HPRPHR′

(1)   $H_2PRPHR' + M \rightarrow MHPRPHR' + \tfrac{1}{2}H_2$
      $MHPRPHR' + R''X \rightarrow R''HPRPHR' + MX$ (2)   $4MPHR' + 4MPHR'' + 4RX_2 \rightarrow 2R''HPRPHR' + R''HPRPHR'' + R'HPRPHR' + 8MX$ Method 2 for the preparation of the unsymmetrically substituted difunctional phosphines gives a theoretical 50 percent yield of the unsymmetrically substituted product and, to be useful, the three products must be separable by means such as distillation, where the R′ and R″ must be of considerably different molecular weight, or by fractional crystallization.

Examples setting forth the stoichiometry of typical reactions for the preparation of these primary-secondary difunctional phosphines and certain of unsymmetrically substituted secondary difunctional phosphines appear below.

Table II

| Ex. | M | Alkali metal | | Phosphine | Moles | Weight, g. | RX | Alkylhalide | | Product |
| --- | --- | --- | --- | --- | --- | --- | --- | --- | --- | --- |
| | | Moles | Weight, g. | | | | | Moles | Weight, g. | |
| 26 | Na | 0.0723 | 1.663 | (CH$_2$)$_4$(PH$_2$)$_2$ | 0.0732 | 8.937 | C$_2$H$_5$Cl | 0.0726 | 4.648 | H$_2$P(CH$_2$)$_4$PHC$_2$H$_5$ |
| 27 | Na | 0.0607 | 1.396 | (CH$_2$)$_3$(PH$_2$)$_2$ | 0.0613 | 6.674 | n-C$_3$H$_7$Cl | 0.0621 | 4.877 | H$_2$P(CH$_2$)$_3$PH(n-C$_3$H$_7$) |
| 28 | Na | 0.0421 | 0.968 | (CH$_2$)$_6$(PH$_2$)$_2$ | 0.0416 | 6.246 | C$_2$H$_5$Cl | 0.0409 | 2.639 | H$_2$P(CH$_2$)$_6$PHC$_2$H$_5$ |
| 29 | K | 0.0598 | 2.338 | (CH$_2$)$_3$(PH$_2$)$_2$ | 0.0591 | 6.387 | CH$_3$Cl | 0.0598 | 3.019 | H$_2$P(CH$_2$)$_3$PHCH$_3$ |
| 30 | Na | 0.0312 | 0.718 | (CH$_2$)$_4$(PH$_2$)$_2$ | 0.0316 | 3.858 | CH$_3$Br | 0.0311 | 2.953 | H$_2$P(CH$_2$)$_4$PHCH$_3$ |
| 31 | Li | 0.0561 | 0.389 | (CH$_2$)$_4$(PH$_2$)$_2$ | 0.0568 | 6.935 | n-C$_5$H$_{11}$Br | 0.0574 | 8.670 | H$_2$P(CH$_2$)$_4$PH(n-C$_5$H$_{11}$) |
| 32 | Na | 0.0626 | 1.440 | (CH$_2$)$_3$(PH$_2$)$_2$ | 0.0631 | 6.819 | n-C$_{12}$H$_{25}$Cl | 0.0623 | 12.758 | H$_2$P(CH$_2$)$_3$PH(n-C$_{12}$H$_{25}$) |
| 33 | Na | 0.0491 | 1.129 | (CH$_2$)$_3$(PH$_2$)$_2$ | 0.0496 | 5.360 | n-C$_8$H$_{17}$Cl | 0.0489 | 7.270 | H$_2$P(CH$_2$)$_3$PH(n-C$_8$H$_{17}$) |
| 34 | Na | 0.0386 | 0.888 | H$_2$P(CH$_2$)$_4$PHC$_2$H$_5$ | 0.0391 | 5.871 | n-C$_3$H$_7$Cl | 0.0403 | 3.165 | n-C$_3$H$_7$HP(CH$_2$)$_4$PHC$_2$H$_5$ |
| 35 | Na | 0.0573 | 1.318 | H$_2$P(CH$_2$)$_3$PH(n-C$_3$H$_7$) | 0.0567 | 8.513 | C$_2$H$_5$Cl | 0.0561 | 3.620 | C$_2$H$_5$HP(CH$_2$)$_3$PH(n-C$_3$H$_7$) |
| 36 | Na | 0.0379 | 0.872 | H$_2$P(CH$_2$)$_4$PHC$_2$H$_5$ | 0.0374 | 5.616 | CH$_3$Cl | 0.0365 | 1.843 | CH$_3$HP(CH$_2$)$_4$PHC$_2$H$_5$ |
| 37 | Na | 0.0280 | 0.644 | H$_2$P(CH$_2$)$_3$PHCH$_3$ | 0.0287 | 3.504 | C$_2$H$_5$Cl | 0.0281 | 1.813 | C$_2$H$_5$HP(CH$_2$)$_3$PHCH$_3$ |
| 38 | K | 0.0192 | 0.751 | H$_2$P(CH$_2$)$_3$PHCH$_3$ | 0.0201 | 2.454 | n-C$_3$H$_7$Cl | 0.0209 | 1.641 | n-C$_3$H$_7$HP(CH$_2$)$_3$PHCH$_3$ |
| 39 | Na | 0.0473 | 1.088 | H$_2$P(CH$_2$)$_4$PH(n-C$_5$H$_{11}$) | 0.0467 | 8.976 | CH$_3$Cl | 0.0480 | 2.424 | CH$_3$HP(CH$_2$)$_4$PH(n-C$_5$H$_{11}$) |
| 40 | Na | 0.0550 | 1.265 | H$_2$P(CH$_2$)$_3$PH(n-C$_{12}$H$_{25}$) | 0.0561 | 15.510 | CH$_3$Br | 0.0556 | 5.279 | CH$_3$HP(CH$_2$)$_3$PH(n-C$_{12}$H$_{25}$) |
| 41 | Na | 0.0481 | 1.106 | H$_2$P(CH$_2$)$_3$PH(n-C$_8$H$_{17}$) | 0.0481 | 10.600 | C$_2$H$_5$Cl | 0.0489 | 3.155 | C$_2$H$_5$HP(CH$_2$)$_3$PH(n-C$_8$H$_{17}$) |

Obviously many modifications and variations of the invention as hereinbefore set forth may be made without departing from the spirit and scope thereof, and therefore only such limitations should be imposed as are indicated in the appended claims.

I claim:

1. The difunctional phosphine (CH$_2$)$_n$(PHR)$_2$ where R is selected from the group consisting of H, alkyl, phenyl, lower alkyl-substituted phenyl and halo-substituted phenyl radicals and $n$ is an integer from three to seven.
2. The difunctional phosphine (CH$_2$)$_3$(PH$_2$)$_2$.
3. The difunctional phosphine (CH$_2$)$_4$(PH$_2$)$_2$.
4. The difunctional phosphine (CH$_2$)$_5$(PH$_2$)$_2$.
5. The difunctional phosphine (CH$_2$)$_3$(PHCH$_3$)$_2$.
6. The difunctional phosphine (CH$_2$)$_3$(PHC$_6$H$_5$)$_2$.
7. The difunctional phosphine CH$_2$(PHCH$_3$)$_2$.
8. The difunctional phosphine $$(CH_2)_5[PH(C_2H_5C_6H_4)]_2$$

9. The difunctional phosphine (CH$_2$)$_4$[PH(ClC$_6$H$_4$)]$_2$.
10. The difunctional phosphine (CH$_2$)$_7$(PHC$_6$H$_5$)$_2$.
11. The difunctional phosphine $$(CH_2)_4[PH(CH_3C_6H_4)]_2$$

12. The difunctional phosphine $$(CH_2)_4[PH(CH_3)_3C_6H_2]_2$$

13. The difunctional phosphine $$(CH_2)_5[PH(BrC_6H_4)]_2$$

References Cited in the file of this patent

UNITED STATES PATENTS 2,642,461    Morris et al.    June 16, 1953

OTHER REFERENCES

Beilstein: Handbuch der organischen Chemie, vol. 4, page 589.